US012804082B2

(12) United States Patent
Miyahara

(10) Patent No.: US 12,804,082 B2
(45) Date of Patent: Nov. 17, 2026

(54) CALIBRATING AN IMAGE READING APPARATUS

(71) Applicant: CANON KABUSHIKI KAISHA, Tokyo (JP)

(72) Inventor: Katsutoshi Miyahara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 18/959,516

(22) Filed: Nov. 25, 2024

(65) Prior Publication Data

US 2025/0203021 A1 Jun. 19, 2025

(30) Foreign Application Priority Data

Dec. 15, 2023 (JP) ................................ 2023-212165

(51) Int. Cl.
*H04N 1/00* (2006.01)
*H04N 1/191* (2006.01)

(52) U.S. Cl.
CPC ..... *H04N 1/00045* (2013.01); *H04N 1/00018* (2013.01); *H04N 1/00037* (2013.01); *H04N 1/00087* (2013.01); *H04N 1/1917* (2013.01); *H04N 2201/0006* (2013.01)

(58) Field of Classification Search
CPC ........... H04N 1/00045; H04N 1/00018; H04N 1/00037; H04N 1/00087; H04N 1/1917; H04N 2201/0006
See application file for complete search history.

(56) References Cited

U.S. PATENT DOCUMENTS

2021/0112174 A1* 4/2021 Kamio ............... H04N 1/00045
2022/0070327 A1 3/2022 Kamio et al. .......... H04N 1/047
2023/0208997 A1 6/2023 Teraji et al. ........... H04N 1/193
2023/0224420 A1 7/2023 Kasamatsu et al. ... H04N 1/393

FOREIGN PATENT DOCUMENTS

JP 2021-061563 4/2021

* cited by examiner

*Primary Examiner* — Nicholas Pachol
(74) *Attorney, Agent, or Firm* — Venable LLP

(57) ABSTRACT

An image reading apparatus includes: a conveyance roller; a plurality of line image sensors; a first obtainment means that obtains coordinates of a plurality of dot patterns on the basis of read data obtained by reading a chart printed a first dot column and a second dot column; a second obtainment means that obtains a distance between coordinates of adjacent dot patterns; and a third obtainment means that obtains a correction value for reading of an image. The chart, the dot patterns of the first dot column and the dot patterns of the second dot column are arranged to be offset from each other in the conveyance direction, and the third obtainment means obtains the correction value on the basis of a conveyance direction distance between coordinates of dot patterns in the first dot column and a conveyance direction distance between coordinates of dot patterns in the second dot column.

12 Claims, 14 Drawing Sheets

CONVEYANCE DIRECTION
106
A
401
400
CIRCUMFERENTIAL LENGTH Yr
WIDTH Xr
y
x

SUB-SCANNING DIRECTION q
MAIN SCANNING DIRECTION p
401a
Gr1
Gr2
GrM
D
(D × 1)/M
(D × (M-1))/M

CALIBRATING AN IMAGE READING APPARATUS

BACKGROUND OF THE INVENTION

Field of the Invention

The present invention relates to an image reading apparatus.

Description of the Related Art

Generally, image reading apparatuses for large-sized documents have a configuration that uses multiple small-sized line image sensors, which has a great cost advantage. The use of multiple line image sensors needs the processing of stitching together the data read by each line image sensor. In this case, when the document conveyance roller exhibits eccentricity, an error will occur in the processing of stitching the data together.

FIGS. 14A and 14B are explanatory diagrams of an example of an image reading apparatus using multiple line image sensors. FIG. 14A shows the configuration of a reading portion of the image reading apparatus, and FIG. 14B shows misalignment that occurs during reading. The image reading apparatus shown as an example is configured to convey a document 110 using an upstream document conveyance roller 107 and a downstream document conveyance roller 108 (hereinafter, when referring to both at the same time, they will be referred to as document conveyance rollers 107, 108), and to read the document 110 using multiple line image sensors (hereinafter, CISs) 106. The multiple CISs 106 are arranged in a staggered pattern in the width direction intersecting the document conveyance direction.

When multiple line image sensors 106 obtain results, the results are stitched together at stitching positions 113. At this time, if either or both of the document conveyance rollers 107, 108 exhibit eccentricity, an error occurs in the stitching positions due to positional misalignment in the conveyance direction between the line image sensors. For example, when straight line patterns 1403 are read as shown in FIG. 14B, eccentricity of the document conveyance rollers 107, 108 may cause misalignment at stitching positions during stitching, causing the straight line patterns 1403 to be read as staggered lines 1404.

To address the above-mentioned issue, a configuration is known in which a calibration process is performed to obtain and correct an error component during reading caused by eccentricity of the document conveyance rollers in advance. Japanese Patent Application Publication No. 2021-061563 discloses a configuration in which, during the calibration process, a document on which multiple dot patterns are printed is read, and the eccentricity of the document conveyance rollers 107, 108 is obtained through curve approximation processing on the basis of the position data of the read dot patterns.

SUMMARY OF THE INVENTION

In the above-described configuration, the influence of eccentricity of the conveyance mechanism is obtained by performing curve approximation on the basis of the coordinate interval ratio of obtained dot patterns. To obtain the eccentricity of the document conveyance rollers 107, 108 with high accuracy to read an image with high accuracy, it is preferable to use a document on which more dot patterns are printed and to perform curve approximation processing on the basis of more data. However, to distinguish between dot patterns and dust in reading, the dot patterns need to be relatively large. This limits the number of patterns printed on the document, that is, the amount of data used for curve approximation.

In view of the above-mentioned issues, an object of the present invention is to provide an image reading apparatus capable of reading an image with high accuracy.

To achieve the above object, an image reading apparatus according to the present invention includes:

- a conveyance roller configured to convey a document in a conveyance direction;
- a plurality of line image sensors configured to read an image on the document conveyed by the conveyance roller;
- a first obtainment means configured to obtain coordinates of a plurality of dot patterns on the basis of read data obtained by reading a chart including a first dot column and a second dot column including the plurality of dot patterns arranged in the conveyance direction, the first dot column and the second dot columns being printed at different locations in a width direction intersecting the conveyance direction;
- a second obtainment means configured to obtain a distance between coordinates of dot patterns that are adjacent to each other on the basis of the coordinates obtained by the first obtainment means; and
- a third obtainment means configured to obtain a correction value for reading of the image by the line image sensors on the basis of the distance obtained by the second obtainment means,
- wherein the dot patterns of the first dot column and the dot patterns of the second dot column are arranged to be offset from each other in the conveyance direction in the chart, and
- wherein the third obtainment means is configured to obtain the correction value on the basis of a conveyance direction distance between coordinates of dot patterns adjacent to each other in the conveyance direction in the first dot column and a conveyance direction distance between coordinates of dot patterns adjacent to each other in the conveyance direction in the second dot column that are obtained by the second obtainment means.

According to the present invention, it is possible to provide an image reading apparatus capable of reading an image with high accuracy.

Further features of the present invention will become apparent from the following description of exemplary embodiments with reference to the attached drawings.

DESCRIPTION OF THE EMBODIMENTS

Hereinafter, a description will be given, with reference to the drawings, of various exemplary embodiments (examples), features, and aspects of the present disclosure. However, the sizes, materials, shapes, their relative arrangements, or the like of constituents described in the embodiments may be appropriately changed according to the configurations, various conditions, or the like of apparatuses to which the disclosure is applied. Therefore, the sizes, materials, shapes, their relative arrangements, or the like of the constituents described in the embodiments do not intend to limit the scope of the disclosure to the following embodiments.

First Embodiment

Figure 14A:
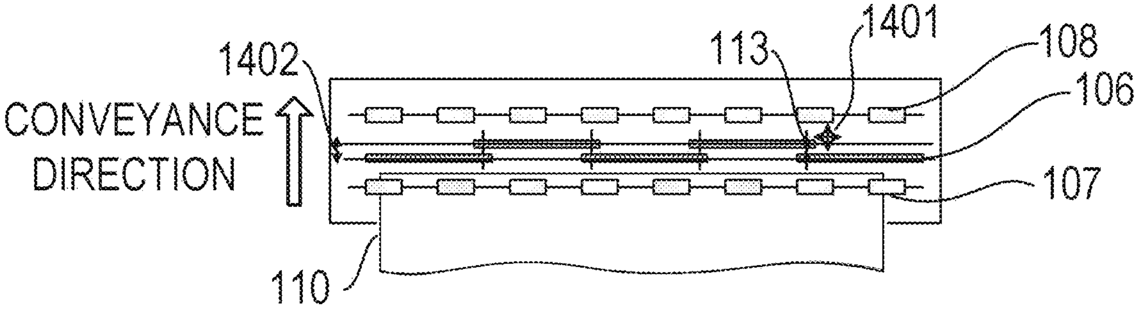
FIGS. 14A and 14B are explanatory diagrams of an example of an image reading apparatus including line image sensors.
Figure 14B:
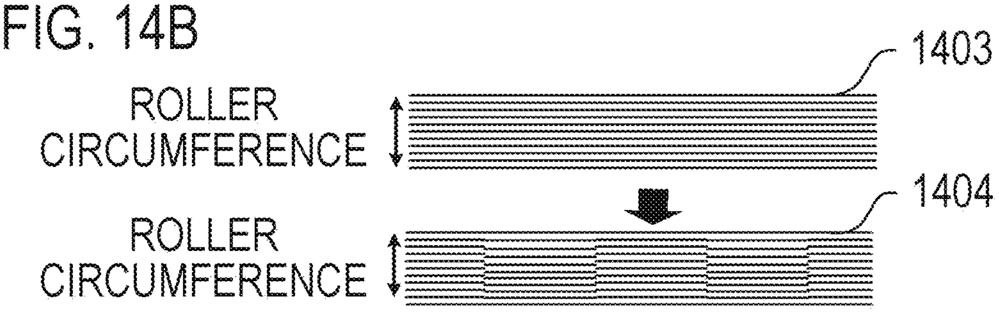

First, a first embodiment of the present invention is described. Although details will be described below, an image reading apparatus according to the first embodiment includes document conveyance rollers 107, 108 and multiple line image sensors (CISs) 106, in a similar manner to the image reading apparatus described with reference to FIGS. 14A and 14B. The first embodiment reads a specific pattern in advance to obtain a correction value for correcting a reading error caused by the influence of eccentricity of the document conveyance rollers 107, 108. The influence of eccentricity of the document conveyance rollers 107, 108 specifically refers to the variation in the amount of document conveyance per unit rotation angle that occurs when the axes of the document conveyance rollers 107, 108 are off-centered due to manufacturing tolerances or the like. The conveyance amount in a unit section may be large or small depending on the phase of the roller, and the error amount due to the eccentricity of the document conveyance rollers 107, 108 becomes zero when added up over one rotation of the roller. Here, the unit section is a section determined by the rotation angles of the document conveyance rollers 107, 108.

Configuration of Image Reading Apparatus

Figure 1A:
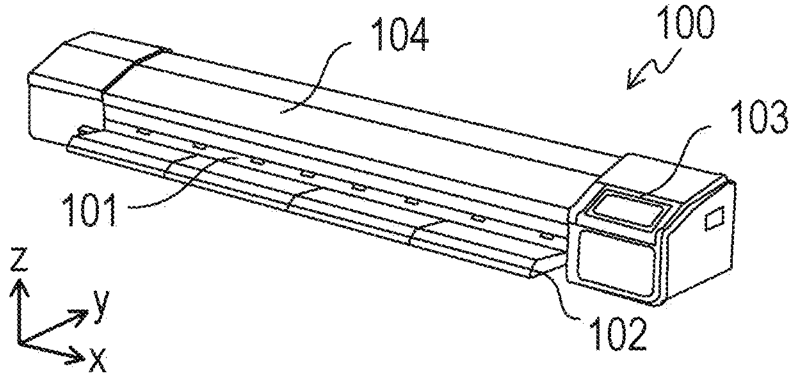
FIGS. 1A to 1C are explanatory diagrams of an image reading apparatus according to a first embodiment.
Figure 1B:
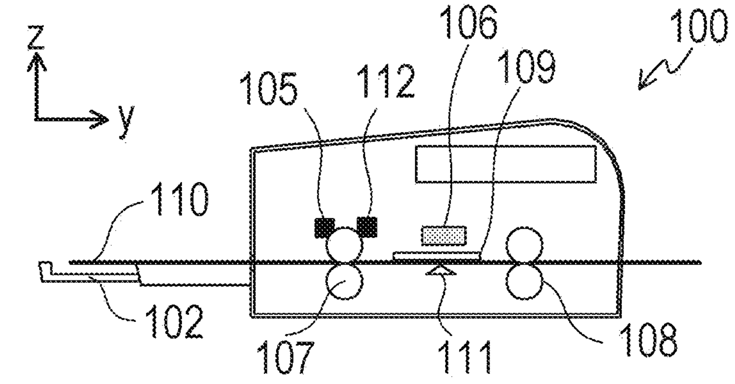
Figure 1C:
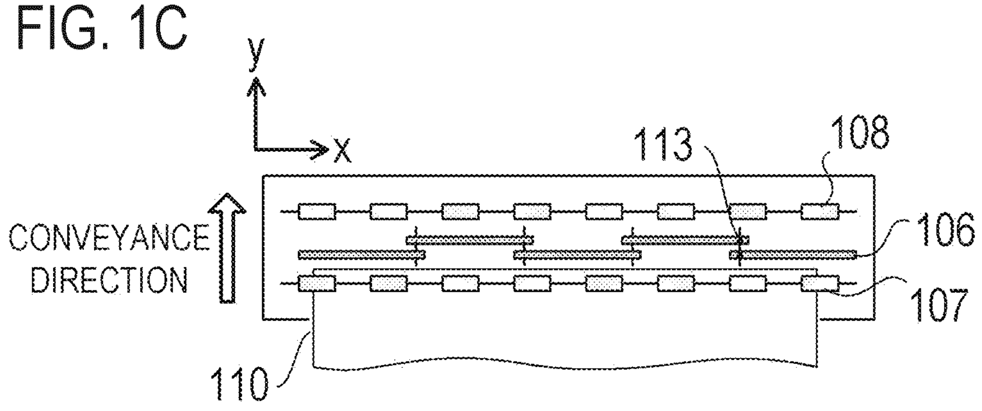

First, the basic configuration of the image reading apparatus according to the first embodiment is described. FIGS. 1A to 1C are explanatory diagrams of an image reading apparatus according to the first embodiment. FIG. 1A is a perspective view showing the appearance of a sheet feed scanner 100, which is an image reading apparatus according to the first embodiment. The scanner 100 has a document feed port 101 and a document feed table 102 in the front side of the apparatus main body. The user places the leading edge of a document on the document feed table 102 such that the center portion of the document is positioned at the center of the feed port, and slides the document on the table to insert it into document feed port 101. The document feed port 101 is designed to tolerate a certain degree of positional misalignment, inclination, and the like during insertion relative to the width of the document in the main scanning direction p that can be read by the scanner 100. The configuration of the document feed path will be described below with reference to FIG. 1B. For the sake of description, the coordinate axes are set as shown in FIG. 1A, and these coordinate axes are similarly applied to the other drawings. Specifically, the direction from one end to the other end in the width direction of the scanner 100 is defined as the x direction, the depth direction from the front side to the rear side of the scanner 100 is defined as the y direction, and the vertical direction from the bottom side to the top side of the scanner 100 is defined as the z direction. The x direction is substantially parallel to the width direction of a document inserted into the scanner 100, and the document conveyance direction is substantially parallel to the y direction intersecting the x direction. In the first embodiment, the x direction, the y direction, and the z direction are perpendicular to each other.

The scanner 100 has an operation portion 103 on the upper surface of the apparatus main body. The operation portion 103 includes physical keys, a touch panel, an LCD panel, and the like and is configured to enable the setting of reading conditions and document size input. Also, a top cover 104 is provided on the upper surface of the scanner 100, and the scanner 100 is configured so that the top cover 104 can be opened upward to allow access to the reading portion and the like and the maintenance of the apparatus main body.

FIGS. 1B and 1C are schematic diagrams showing the internal configuration of the scanner 100, with FIG. 1B being a cross-sectional view and FIG. 1C being a top view. In the cross-sectional view of FIG. 1B, the left side is the upstream side and the right side is the downstream side in the feeding direction of a document 110, and a document 110 is conveyed from the left side to the right side (y direction). A document 110 fed by a user through the document feed table 102 passes through a planar convey path and is ejected from the back side of the main body.

A document detection sensor 105 is a sensor that detects insertion of a document 110. When the document detection sensor 105 detects insertion of a document 110, a control portion 202 (see FIG. 2) of the scanner 100 rotates the upstream document conveyance roller 107 to draw the document 110 into the main body. An edge detection sensor 112 is a sensor used to detect the leading edge of the document 110 that has been drawn into the main body by the rotation of the upstream document conveyance roller 107. The detection result of the edge detection sensor 112 is also used to determine the reading start position of the document 110 and to detect the position of the trailing edge of the document 110.

Inside of the main body, the document 110 passes between a glass plate 109 and a document pressing plate 111. The document pressing plate 111 functions to press the document 110 against the glass plate 109 with a predetermined pressure. CISs 106 are line image sensors in which light receiving elements are arranged in a main scanning direction p (X direction in the drawing) and include multiple chips formed by multiple light receiving elements. Each CIS 106 has a reading surface facing the glass plate 109 and is designed so that the reading focal position is located at the contact surface between the document 110 and the glass plate 109.

The downstream document conveyance roller 108 is configured to follow the upstream document conveyance roller 107 through a belt (not shown) and functions to discharge the document that has passed through the pressing region, in which the document is pressed against the glass plate 109 by the document pressing plate 111, to the downstream side. The control portion 202, which will be described below, includes a circuit board for controlling detection sensors, a motor (now shown) for rotating the upstream document conveyance roller 107, the CISs 106, the operation portion 103, and the like, for example.

As shown in the top view of FIG. 1C, the scanner 100 includes multiple CISs 106 (five in the first embodiment) arranged in a staggered pattern in the main scanning direction p. The scanner 100 performs reading with each CIS 106, and the control portion 202 performs processing to stitch the data read by each CIS 106 at stitching positions 113.

Figure 2:
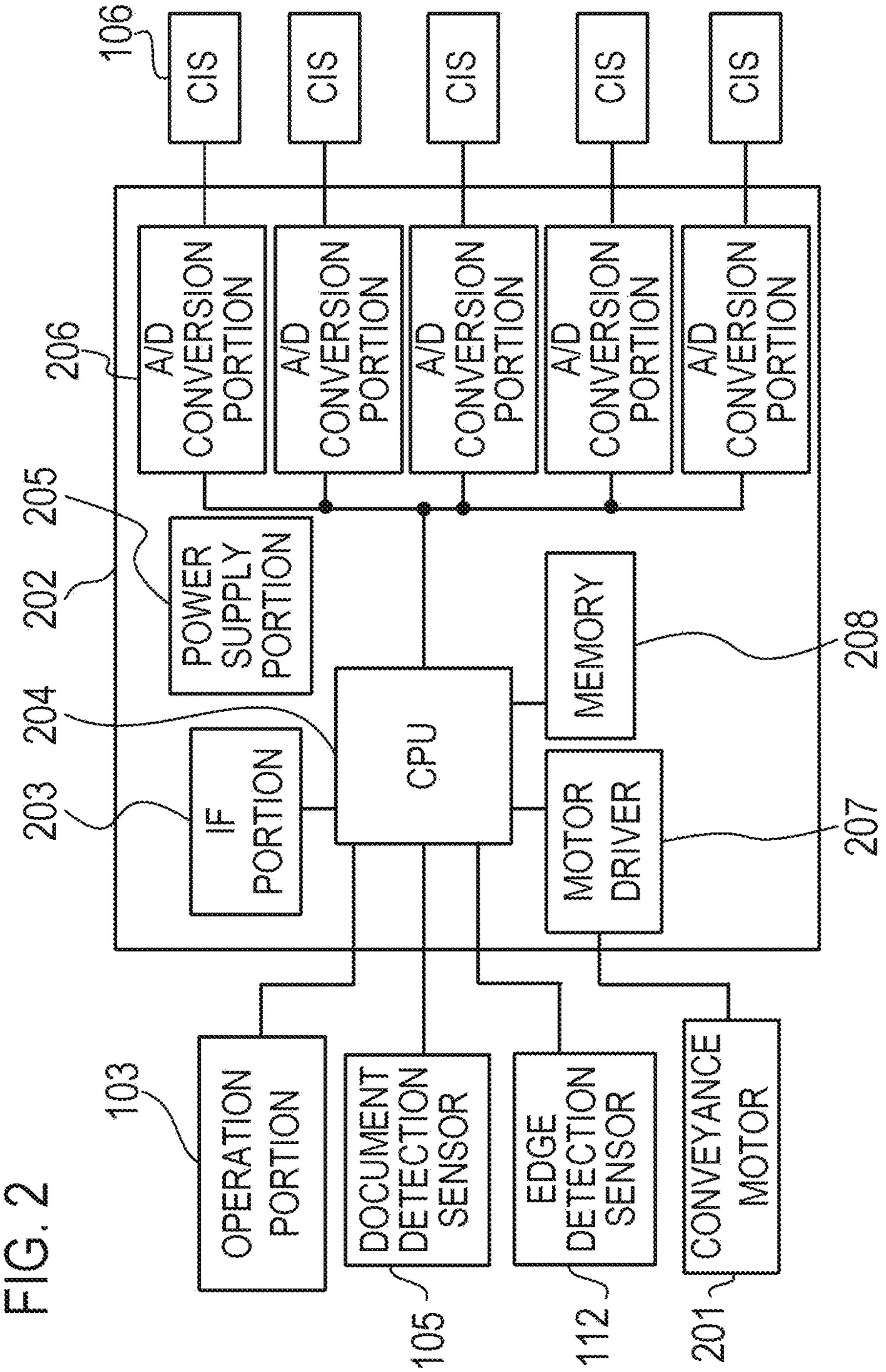
FIG. 2 is a block diagram of a hardware configuration of the image reading apparatus according to the first embodiment.

FIG. 2 is a block diagram showing the hardware configuration of the scanner 100 according to the present embodiment. The control portion 202, which controls image reading and the like in the scanner 100, includes a CPU 204, a memory 208, a motor driver 207, an interface (hereinafter referred to as IF) portion 203, A/D conversion portions 206, and a power supply portion 205. An operation portion 103 is a touch panel with a liquid crystal display (LCD). The LCD of the operation portion 103 displays information on the document to be read, settings of the reading apparatus, and the like in accordance with instructions from the CPU 204. Also, the user can operate the touch panel of the operation portion 103 to perform input to the scanner 100, such as a change in various settings, while checking the information displayed on the LCD of the operation portion 103.

A conveyance motor 201 is controlled by the CPU 204 via the motor driver 207 to rotate the upstream document conveyance roller 107 and the downstream document conveyance roller 108. Outputs of the document detection sensor 105 and the edge detection sensor 112 are input to the CPU 204. The CPU 204 performs control such as determining the drive timing of the multiple CISs 106 on the basis of changes in output signals of these sensors and the state of the conveyance motor 201.

The CISs 106 output the read images to the control portion 202 as analog signals. The analog signals output from the multiple CISs 106 are converted into digital signals by the A/D conversion portions 206 and input to the CPU 204. The CPU 204 processes the data converted into digital signals by each A/D conversion portion 206, and transmits the processed data as image data via the IF portion 203 to an external device connected via a USB or LAN. A power supply portion 205 generates a voltage required for each portion and supplies power. The memory 208 is capable of storing image data of multiple lines.

Calibration Process

Figure 3:
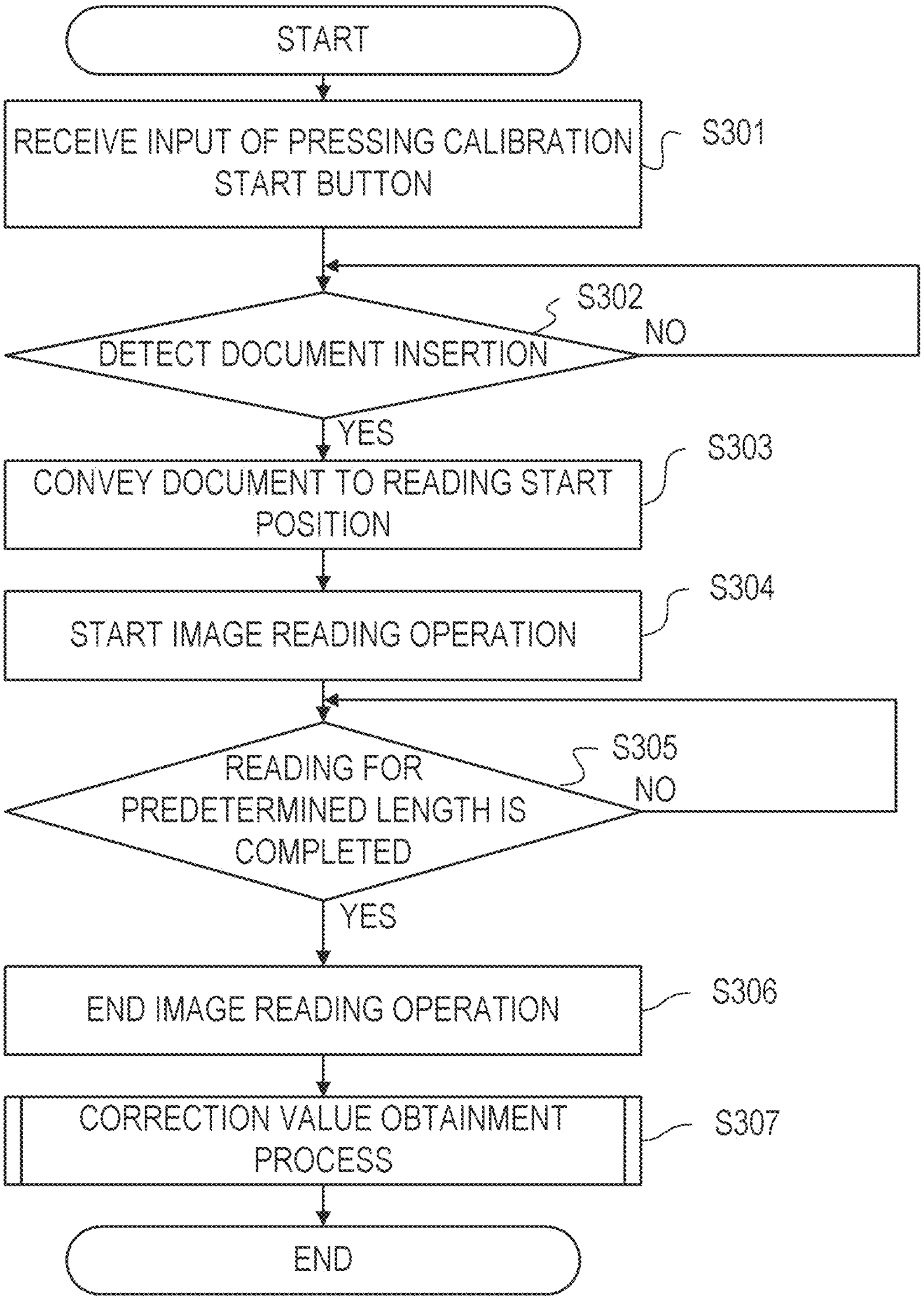
FIG. 3 is a flowchart of a calibration process according to the first embodiment.

Referring to FIG. 3, the flow of a calibration process of reading a document 110 using the CISs 106 and obtaining a correction value is now described. FIG. 3 is a flowchart of the calibration process performed by the scanner 100. As for correction value obtainment timing, the correction value may be obtained in advance, or may be obtained each time reading is performed. Alternatively, the scanner 100 may be configured to prompt the user to obtain a correction value periodically, such as once every multiple reading operations or once within a predetermined period of time.

When a correction value is obtained in advance, a correction value is obtained by reading a predetermined document prepared in advance at the factory or by the user. The same correction value is subsequently used for each reading. In this case, since it is not necessary to obtain a correction value for each reading, it is possible to reduce the reading time and improve productivity.

In contrast, when a correction value is obtained for each reading, a correction value is obtained by reading a predetermined document before reading, or by reading a document on which a pattern for obtaining a correction value is printed in the header portion of the document. In this case, the current error components can be timely corrected, achieving highly accurate reading.

In the calibration process, at step S301, the CPU 204 first receives an input from the user pressing the calibration start button of the operation portion 103. This step places the scanner 100 into a state of waiting for insertion of a special document for calibration. Hereinafter, for the sake of simplicity, "Step S . . . " will be abbreviated to "S . . . ".

At S302, the CPU 204 determines whether insertion of a document 110 for calibration set by the user has been detected. If the determination result at this step is true, that is, if insertion of the document 110 is detected, the process proceeds to S303. If the determination result at this step is false, that is, if insertion of the document 110 has not been detected, the insertion detection determination of the document 110 is performed again at S302.

At S303, the CPU 204 controls the conveyance motor 201 to convey the document 110 to the reading start position. When the document 110 is conveyed to the reading start position, the process proceeds to S304.

At S304, the CPU 204 starts an image reading operation and stores the data obtained by the reading (referred to as read data) in the memory 208.

At S305, the CPU 204 determines whether reading for a predetermined length has been completed at S304. If the determination result at this step is true, that is, reading for the predetermined length has been completed, the process proceeds to S306. If the determination result at this step is false and reading for the predetermined length has not been completed, the reading operation is continued until reading for the predetermined length is completed, and the determination is performed again at S305.

At S306, the CPU 204 ends the image reading operation and conveys the document 110 to the paper discharge position. When the image reading operation is completed, the process proceeds to S307.

At S307, the CPU 204 performs a correction value obtainment process. The correction value obtained at this step is stored in the memory 208, and is read out and applied during normal reading operations. Step S307 may be started before the conveyance of the document 110 to the paper discharge position is completed.

Correction Value Obtainment Process

Figures 4A, 4B:
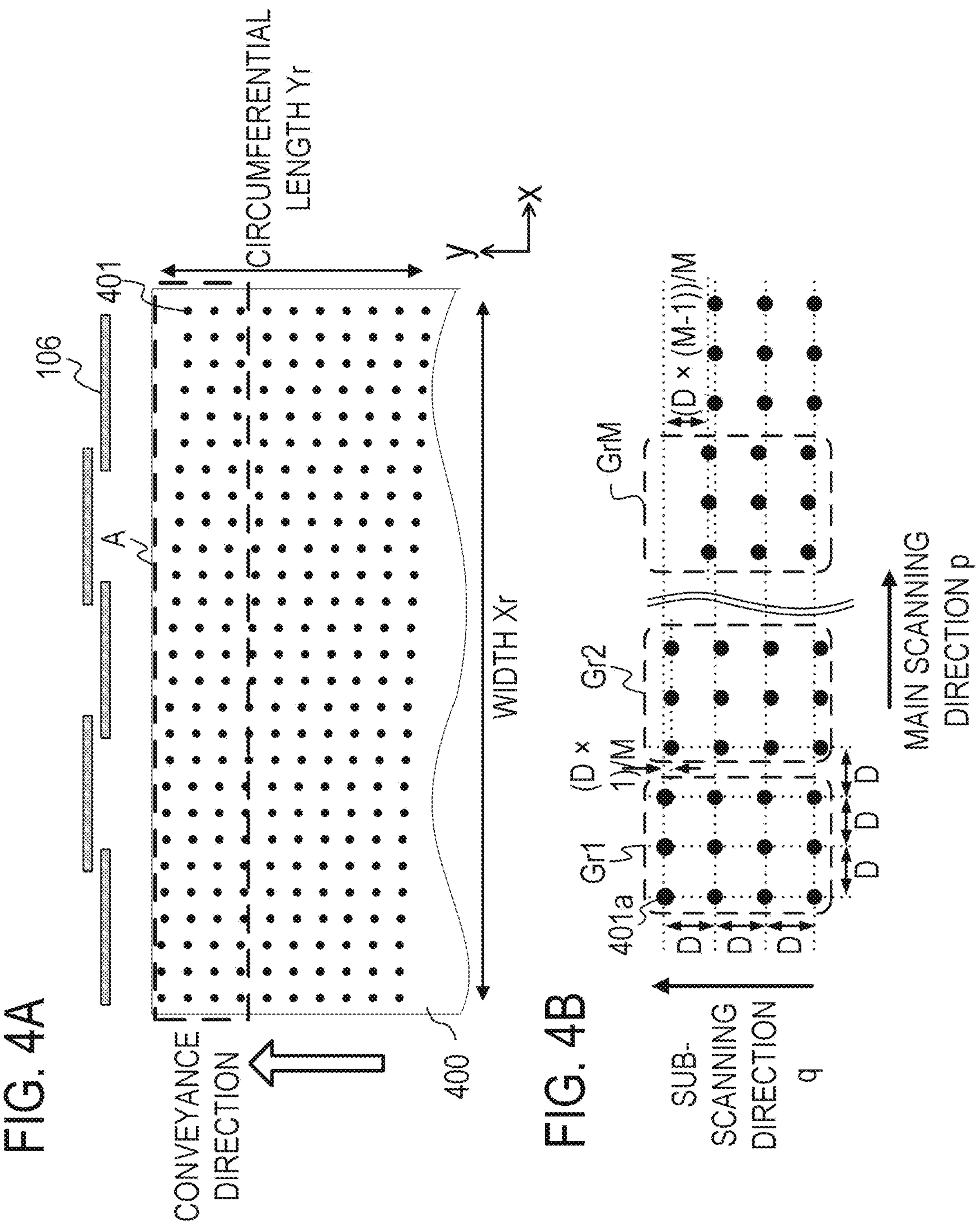
FIGS. 4A and 4B are diagrams showing a pattern for a correction value obtainment process according to the first embodiment.
Figure 5:
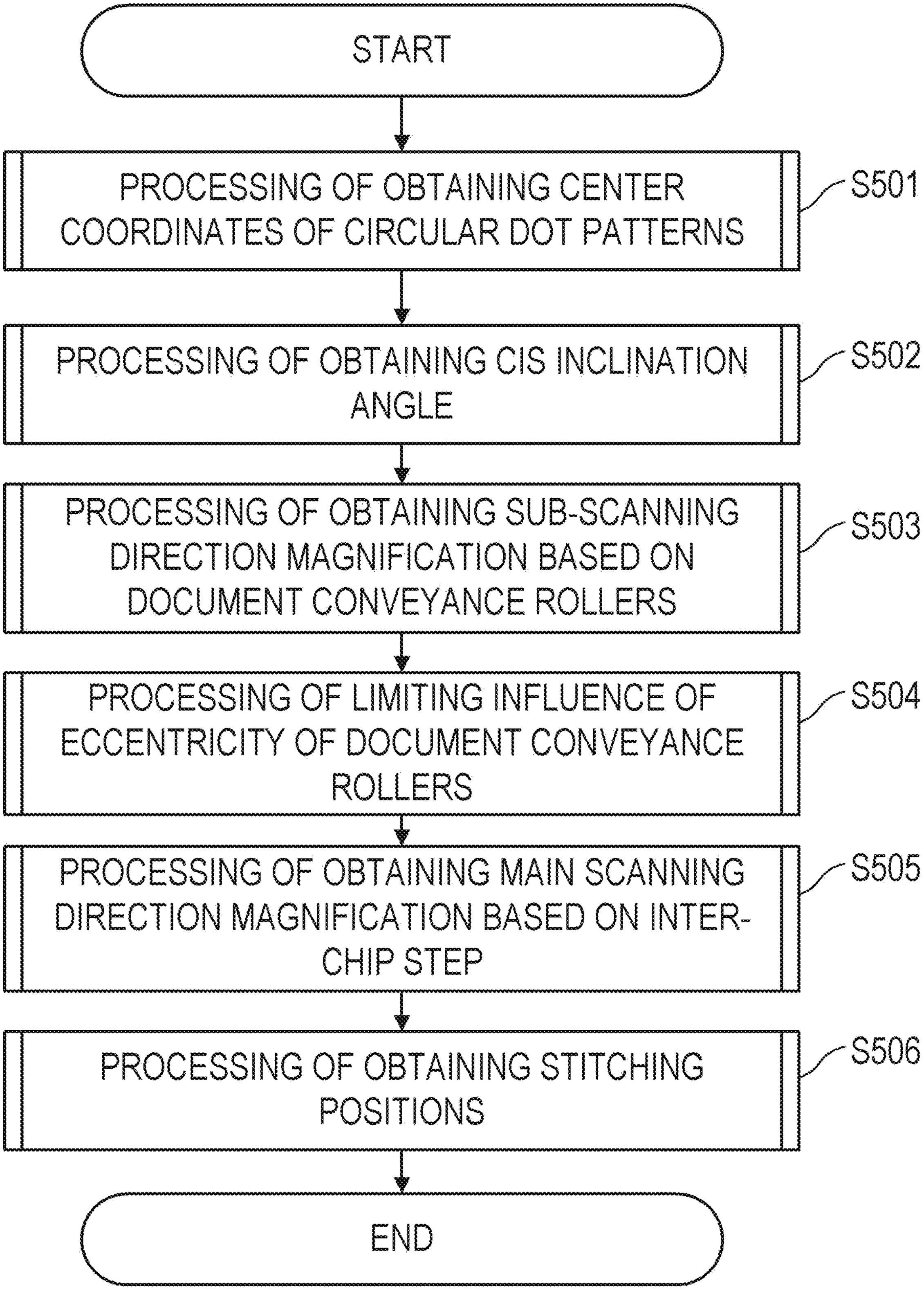
FIG. 5 is a flowchart illustrating the correction value obtainment process according to the first embodiment.

Referring to FIGS. 4A, 4B, and 5, the flow of obtaining a correction value on the basis of the read pattern, that is, the correction value obtainment process at S307 in FIG. 3 is now described in detail. FIGS. 4A and 4B are diagrams showing a calibration chart 400 that is a pattern for correction value obtainment process in the first embodiment. The calibration chart 400 is an example of the document 110 for calibration. FIG. 4A shows substantially the entire calibration chart 400, and FIG. 4B is an enlarged view of the left and right end regions of region A surrounded by the dotted line in FIG. 4A, showing the details of the calibration chart 400.

As shown in FIG. 4A, the calibration chart 400 includes multiple circular dot patterns 401, formed by multiple ON dots with a pixel value of 1, printed in a mutually isolated manner. The scanner 100 reads the dot patterns 401 with the CISs 106 while the document 110 is being conveyed by the document conveyance rollers 107, 108. As the pattern arrangement on the document, multiple circular dot patterns 401 are printed across the width Xr of the readable region of the scanner 100 and a circumferential length Yr, which is the length of the circumference of the document conveyance rollers 107, 108. The multiple dot patterns 401 may also be printed over an area greater than or equal to the circumference of the document conveyance rollers 107, 108. In this specification, the dot patterns 401 are also referred to as lattice points.

Referring to FIG. 4B, the arrangement of the dot patterns 401 is now described in further detail. Hereinafter, the main scanning direction p of the calibration chart 400 is described as a direction parallel to the x direction, which is the width direction of the calibration chart 400, and the sub-scanning direction q is described as a direction parallel to the y direction, which is the conveyance direction of the calibration chart 400. The calibration chart 400 has multiple columns in which multiple dot patterns 401 are arranged at regular intervals in the sub-scanning direction q, and these columns are formed side by side in the main scanning direction p.

The dot pattern 401 located at one end of the calibration chart 400 in the main scanning direction p and at one end of the sub-scanning direction q, which is the dot pattern 401 at the upper left corner in FIG. 4B, is defined as a dot pattern 401*a*. From this dot pattern 401*a*, dot patterns 401 are arranged at regular intervals in the sub-scanning direction q and separated by a distance D so that a first dot column of dot patterns 401 is formed. Also, with respect to each of the dot patterns 401 in the first dot column, dot patterns 401 of two dots are arranged at regular intervals in the main scanning direction p (x direction) and separated by the distance D. That is, three first dot columns, each including dot patterns 401 of the mutually same coordinates in the sub-scanning direction q, are formed. A collection of the dot patterns 401 formed by these three first dot columns extending in the sub-scanning direction q is referred to as a dot pattern group Gr1. The calibration chart 400 includes M dot pattern groups in total, each of which is formed by three dot columns of dot patterns 401 arranged at regular intervals in the sub-scanning direction q in a similar manner.

The dot pattern group Gr2 is adjacent to the dot pattern group Gr1 in the main scanning direction p, and is formed by three second dot columns. In the first embodiment, the interval between the dot patterns 401 in the dot pattern group Gr1 and the dot pattern group Gr2 that are adjacent to each other in the main scanning direction p is the distance D. The dot patterns 401 in the dot pattern group Gr2 are the third to fifth dot patterns 401 from the dot pattern 401*a* in the dot pattern group Gr1 in the main scanning direction p. The sub-scanning direction positions of the dot patterns 401 in the dot pattern group Gr2 are offset by a distance D/M from the dot patterns 401 in the dot pattern group Gr1. That is, the amount of offset of the dot patterns 401 in the sub-scanning direction q is a distance obtained by dividing the distance D by M.

Similarly, the sub-scanning direction positions of the dot patterns 401 in the dot pattern group Gr3 adjacent to the dot pattern group Gr2 are offset by the distance D/M from the dot patterns 401 in the dot pattern group Gr2. In this manner, a dot pattern group is formed by arranging dot patterns 401 offset from the dot patterns 401 of the adjacent dot pattern group by the distance D/M in the sub-scanning direction q, and a total of M dot pattern groups are formed. That is, the sub-scanning direction positions of the dot patterns 401 in the dot pattern group GrM are offset from the dot patterns 401 in the dot pattern group Gr1 by a distance $(D\times(M-1))/M$. The dot pattern group GrM is the dot pattern group located at the edge of the calibration chart 400 opposite to the dot pattern group Gr1 in the width direction. The dot pattern group GrM includes three Mth dot columns. By arranging the dot patterns 401 in this manner, the dot pattern groups Gr1 to GrM are formed. In the overall dot patterns in this arrangement, dots of other dot pattern groups are interpolated at regular intervals between dots of the reference dot pattern group Gr1 in the sub-scanning direction q.

Here, the number of divisions M, which is also the total number of dot pattern groups, is preferably defined as a number that satisfies $M\geq D/(2\times R)$, where R is the radius of the dot patterns 401. This is because all dot patterns 401 are arranged without gaps in between in the sub-scanning direction q when the number of divisions M satisfies the above expression and the amount of offset between dot pattern groups in the sub-scanning direction q is set to a distance D/M. In other words, satisfying the above conditions causes dot patterns 401 that are adjacent in the sub-scanning direction q to overlap each other if all dot patterns 401 are arranged at the same position in the main scanning direction p. In the first embodiment, the dot chart is arranged so that the offset between the sub-scanning coordinates of adjacent dot pattern groups is D/M, but there is no limitation to this. It is also preferable to set the offset between the sub-scanning coordinates to a multiple of D/M.

FIG. 5 is a flowchart of the correction value obtainment process according to the first embodiment. In the correction value obtainment process, the steps of processing of S501 to S506 are sequentially performed. In the correction value obtainment process, first at S501, the CPU 204 functions as an obtainment means that obtains the center coordinates of the circular dot patterns 401, and obtains the center coordinates of each of the circular dot patterns 401 from the read data obtained by the image reading operation. The center coordinates obtained at this step are used in the process of obtaining correction values, which will be described below.

At S502, the CPU 204 performs processing for obtaining the inclination angles of the CISs 106. The circular dot patterns 401 are arranged concentrically so that the sum of the coordinates with respect to the reference coordinates is zero. In the first embodiment, this arrangement relationship is used to obtain the inclination angle. The processing of obtaining the inclination angles at this step is processing for limiting misalignment of stitching positions 113 when the read data is stitched together. The information on the inclination angles of the CISs 106 obtained at this step allows read images to be stitched with high accuracy at a later step. In the processing of obtaining correction values, which will be described below, the correction values corresponding to the inclination angles of the CISs 106 obtained at step S502 are applied in advance before the processing is performed.

At S503, the CPU 204 performs processing of obtaining the sub-scanning direction magnification based on the document conveyance rollers 107, 108. The processing of obtaining the sub-scanning direction magnification based on the document conveyance rollers 107, 108 is processing of obtaining the sub-scanning direction magnification based on diameter errors of the document conveyance rollers 107, 108, which affect the overall reading result of the scanner 100.

At S504, the CPU 204 performs processing of limiting the influence of eccentricity of the document conveyance rollers 107, 108. This step is processing for correcting a reading error in the sub-scanning direction q caused by eccentricity of the document conveyance rollers 107, 108, which affects the overall reading result of the scanner 100, for example by calculating the eccentricity rates of the document conveyance rollers 107, 108.

At S505, the CPU 204 performs processing of obtaining the main scanning direction magnification based on an inter-chip step. The processing of obtaining the main scanning direction magnification based on an inter-chip step is processing for correcting a reading error in the main scanning direction p caused by a gap between chips located inside of the CISs 106.

At S506, the CPU 204 performs processing of obtaining stitching positions. The stitching position obtainment processing is processing for accurately stitching together the reading results of the CISs 106, and is processing of obtaining stitching positions 113 by applying in advance the correction values that correspond to the respective steps and are obtained from the results of S502 to S505. This completes the calibration involving the obtainment of each correction value.

Center Coordinate Obtainment Processing

Figure 6:
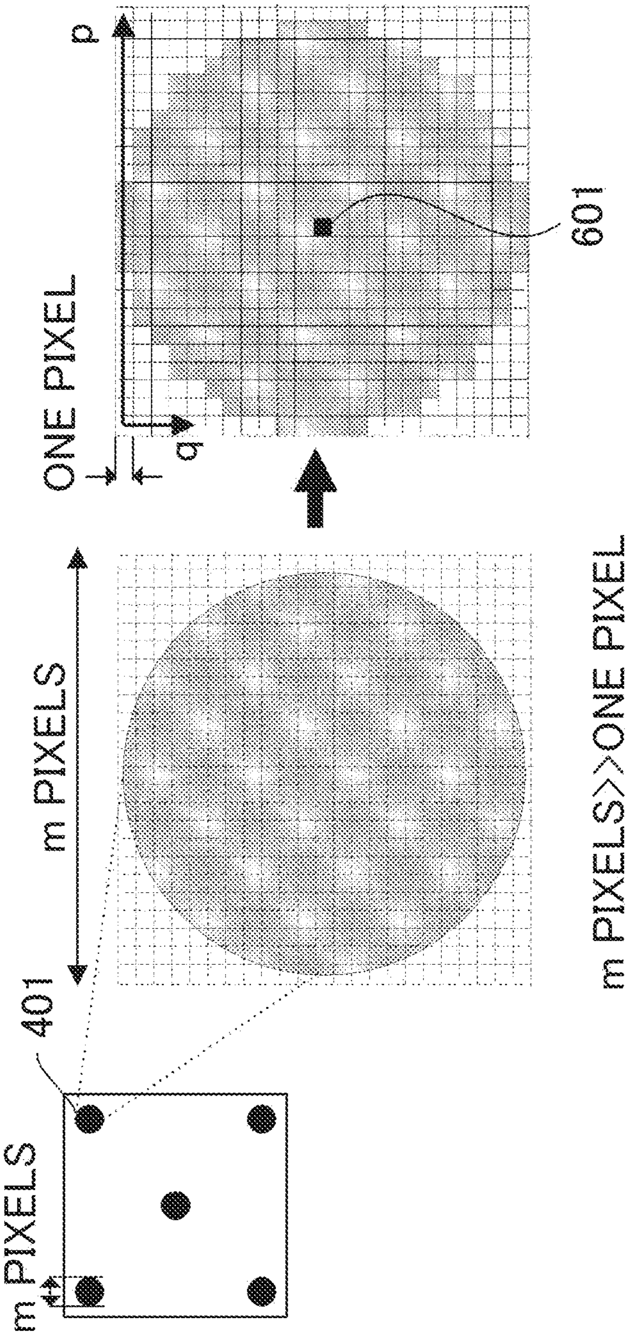
FIG. 6 is an explanatory diagram of a circular dot pattern according to the first embodiment.
Figure 7:
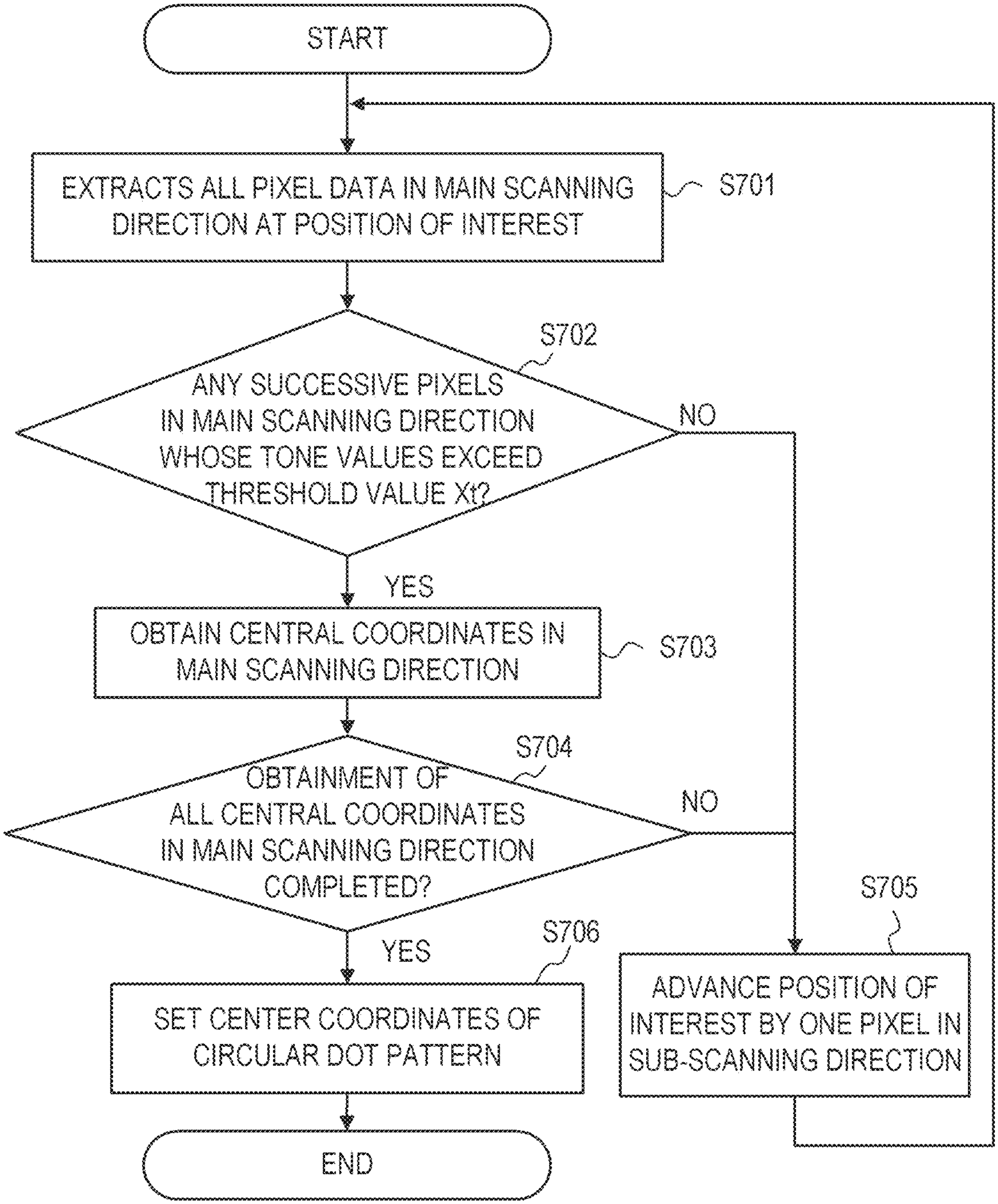
FIG. 7 is a flowchart of the center coordinate obtainment processing according to the first embodiment.

Referring to FIGS. 6 and 7, the processing of obtaining the center coordinates 601 of the circular dot patterns 401 on the basis of the read data, that is, the center coordinate obtainment processing at S501 in FIG. 5, is now described in detail. FIG. 6 is an explanatory diagram of a circular dot pattern 401 in a calibration chart 400 that is the target of reading for calibration. FIG. 6 shows an enlarged view of the circular dot pattern 401 and an enlarged view of the binarized dot pattern 401. In the enlarged views, the dot pattern 401 is shown in gray to clearly indicate the center coordinates 601 of the dot pattern 401. The circular dot pattern 401 is configured to be somewhat large relative to the pixels to be read by the scanner 100.

FIG. 7 is a flowchart of the center coordinate obtainment processing according to the first embodiment. In the center coordinate obtainment processing, first at S701, the CPU 204 extracts, from all read data, all pixel data in the main scanning direction p of the CISs 106 at a position of interest in the sub-scanning direction q of the CISs 106. Here, the position of interest in the sub-scanning direction q is the position in the sub-scanning direction q that is used to extract data by focusing on one pixel in the sub-scanning direction q as one line. In the center coordinate obtainment processing, pixel data is extracted one pixel at a time in the sub-scanning direction q.

At S702, the CPU 204 determines, on the basis of the pixel data extracted at S701, whether there are any successive pixels in the main scanning direction p whose tone values exceed a threshold value Xt. For this determination, the image data is binarized for each pixel as shown in the right side of FIG. 6. If the determination result at this step is true, that is, if there are successive pixels in the main scanning direction p whose tone values exceed the threshold value Xt, the process proceeds to S703. If the determination result at this step is false, that is, if there are no successive pixels in the main scanning direction p whose tone values exceed the threshold value Xt, the process proceeds to S705. The threshold value Xt used at this step is set in advance, and its data is stored in the memory 208.

At S703, the CPU 204 obtains the central coordinates of the dot pattern 401 in the main scanning direction p. Specifically, the position of the central pixel of the successive pixels whose tone values exceed the threshold value Xt is obtained as the central coordinates in the main scanning direction p.

At S704, the CPU 204 determines whether obtainment of all central coordinates in the main scanning direction p, that is, the central coordinates in the main scanning direction p of all lines in the sub-scanning direction q has been completed. If the determination result at this step is true, that is, if obtainment of all central coordinates in the main scanning direction p has been completed, the process proceeds to S706. If the determination result at this step is false, that is, if there are any central coordinates among all center coordinates in the main scanning direction p that have not been obtained, the process proceeds to S705.

At S705, the CPU 204 advances the position of interest in the sub-scanning direction q by one pixel in the sub-scanning direction q. Then, the process proceeds to S701, where pixel data is extracted at the new position of interest. In this manner, steps S701 to S705 are repeated until obtainment of all central coordinates in the main scanning direction p is completed.

At S706, the CPU 204 calculates the average of the obtained central coordinates in the main scanning direction p, and sets the calculated average value as the center coordinates 601 of the circular dot pattern 401, which is a lattice point. The position in the sub-scanning direction q of the center coordinates 601 may be, for example, the position of the line at the center in the sub-scanning direction q among the lines having successive pixels in the main scanning direction p whose tone values exceed the threshold value Xt. In this manner, in the scanner 100, the CPU 204 functions as a first obtainment means that obtains the coordinates of each of the multiple dot patterns 401 printed on the calibration chart 400.

When consideration is given to a reading error due to dust in obtaining the central coordinates in the main scanning direction p, it is preferable to use larger dot patterns 401. Also, when consideration is given to a reading error due to gaps between chips of the CISs 106, the center coordinates need to be obtained by selecting a section that does not straddle chips in obtaining the coordinates of the main scanning direction p.

The shape of the dot pattern does not necessarily have to be circular, but a substantially circular shape as shown in FIG. 6 is preferable. This is because a substantially circular shape is less likely to be affected by an error component in the reading for obtaining the center coordinates 601. For example, if a document has rectangular dot patterns and is tilted when it is set, it would be difficult to determine whether the pixel data in the main scanning direction p of the image data read by the CISs 106 includes successive pixels in the main scanning direction p whose tone values exceed the threshold value Xt. A substantially circular shape allows successive pixel data in the main scanning direction p whose tone values exceed the threshold value Xt to be distinguished easier than a rectangular shape. Also, when the dot pattern is substantially circular, it is not necessary to perform the processing of obtaining the center coordinates for all lines in the sub-scanning direction q as in steps S704 to S706 in FIG. 7. In other words, the center coordinates 601 of the dot pattern can be obtained by estimating successive pixel data in the main scanning direction p whose tone values exceed the threshold value Xt, assuming that the dot pattern is substantially circular. This shortens the time required to obtain the center coordinates.

Sub-Scanning Direction Magnification Obtainment Processing

Referring to FIGS. 8, 9A, 9B, and 10, the sub-scanning direction magnification obtainment processing in the first embodiment, that is, the sub-scanning direction magnification obtainment processing at S503 in FIG. 5 is now described in detail.

Figure 8:
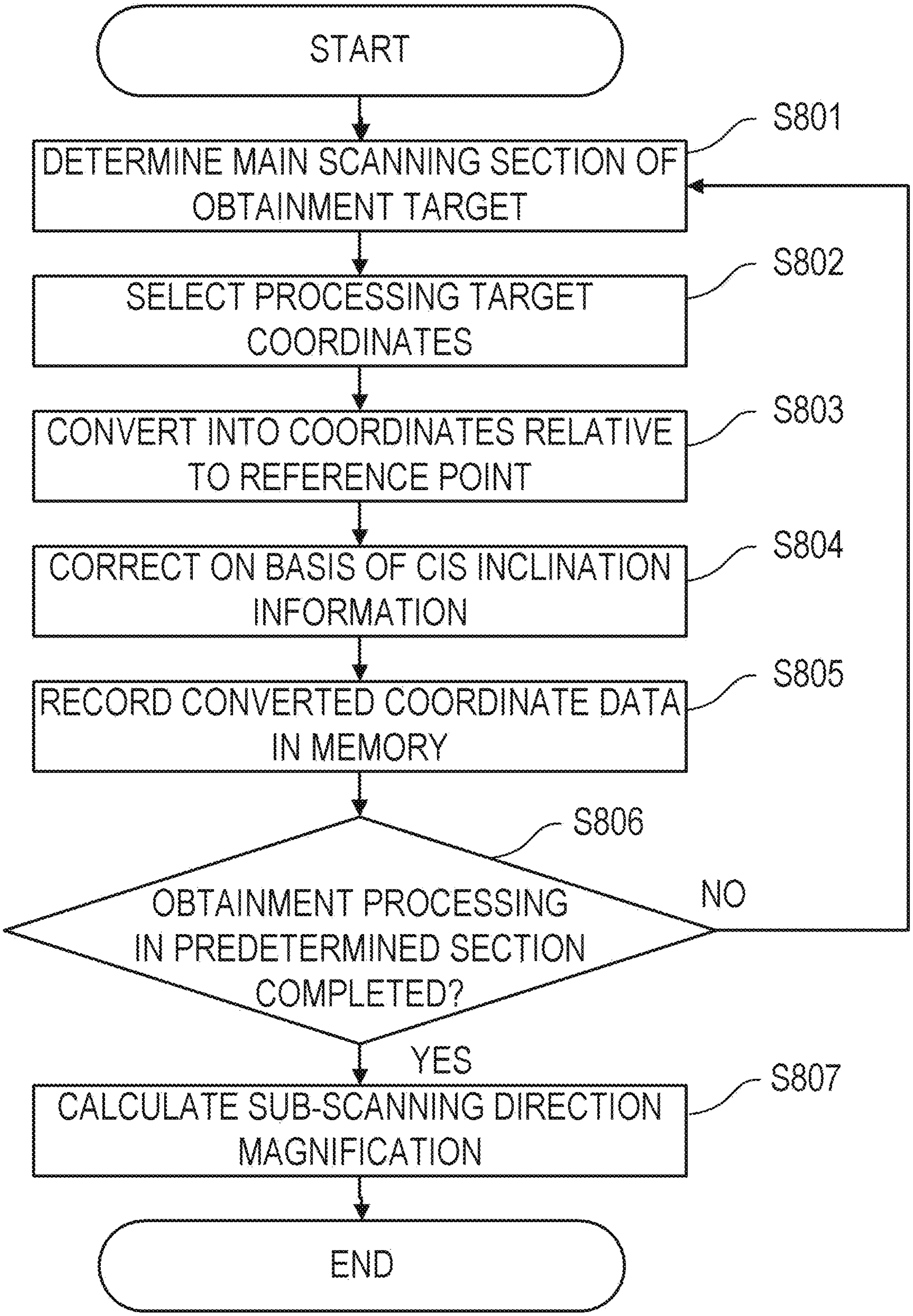
FIG. 8 is a flowchart of a sub-scanning direction magnification obtainment processing according to the first embodiment.

FIG. 8 is a flowchart of a sub-scanning direction magnification obtainment processing according to the first embodiment. At S801, the CPU 204 determines a main scanning section for which a sub-scanning direction magnification is to be obtained. The main scanning section determined at this step is a main scanning region read by one of the multiple CIS chips forming one CIS 106.

At S802, the CPU 204 selects processing target coordinates on the basis of the center coordinate data of circular dot patterns 401. Specifically, the center coordinates 601 of the circular dot patterns 401 included in the main scanning section determined at S801 is searched for in the sub-scanning direction q. Then, from the center coordinates 601 detected by the search, a reference point and a main-scanning distance measurement point are first selected. The reference point and the main-scanning distance measurement point are the center coordinates 601 of dot patterns 401 that have the same coordinate in the sub-scanning direction q in the chart. As the reference point and the main-scanning distance measurement point, points are selected that are located on opposite sides of the pixel located at the center of the predetermined main scanning section of the sensor chip that reads the main scanning section. Here, of the two selected center coordinates 601, the center coordinates 601 on the reference side in the main scanning direction (the side corresponding to the leading pixel) are selected as the reference point, and the other center coordinates 601 are selected as the main-scanning distance measurement point.

After selecting the reference point and the main-scanning distance measurement point, the CPU 204 selects a sub-scanning distance measurement point. The sub-scanning distance measurement point is the center coordinates of a circular dot pattern 401 having the same coordinate in the main scanning direction p in the chart, and a coordinate point is selected that is located at a position in the chart where the distance between the reference point and the main-scanning distance measurement point and the distance between the reference point and the sub-scanning distance measurement point are the same. In this manner, the CPU 204 obtains the main scanning direction distance (width direction distance) between the reference dot pattern serving as a reference and the dot pattern adjacent to the reference dot pattern in the main scanning direction p. Similarly, the CPU 204 obtains the sub-scanning direction distance (conveyance direction distance) between the reference dot pattern and a dot pattern adjacent to the reference dot pattern in the sub-scanning direction q.

Figure 9A:
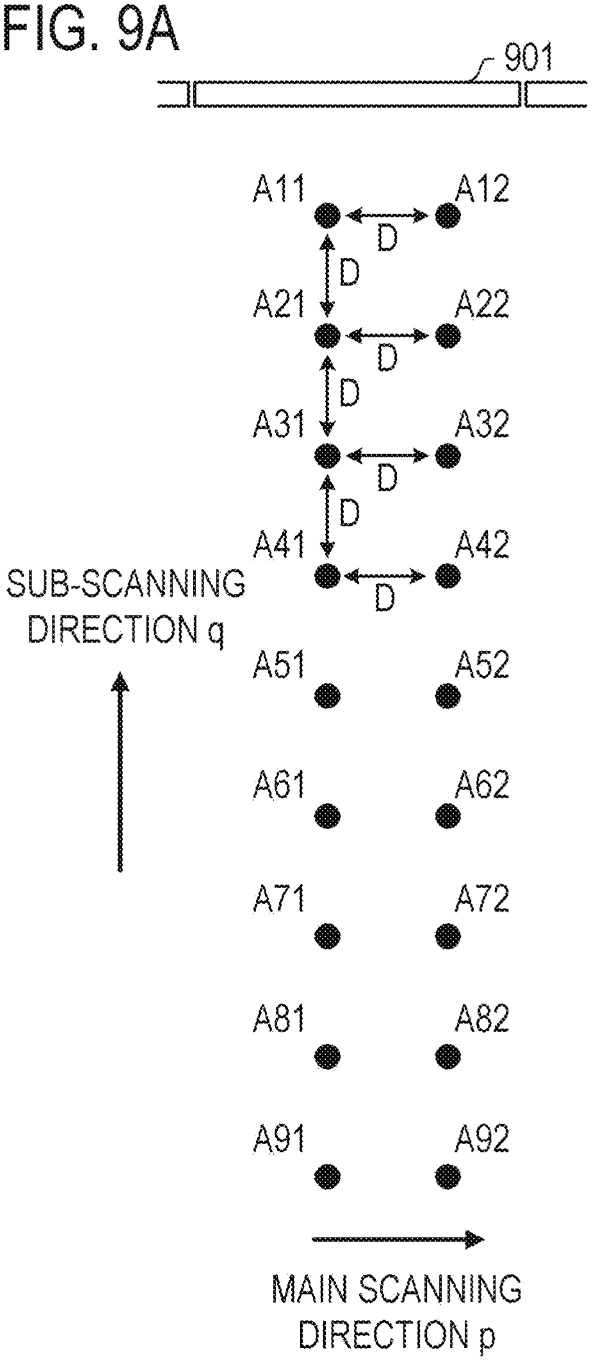
FIGS. 9A and 9B are explanatory diagrams of a method for reading dot patterns according to the first embodiment.
Figure 9B:
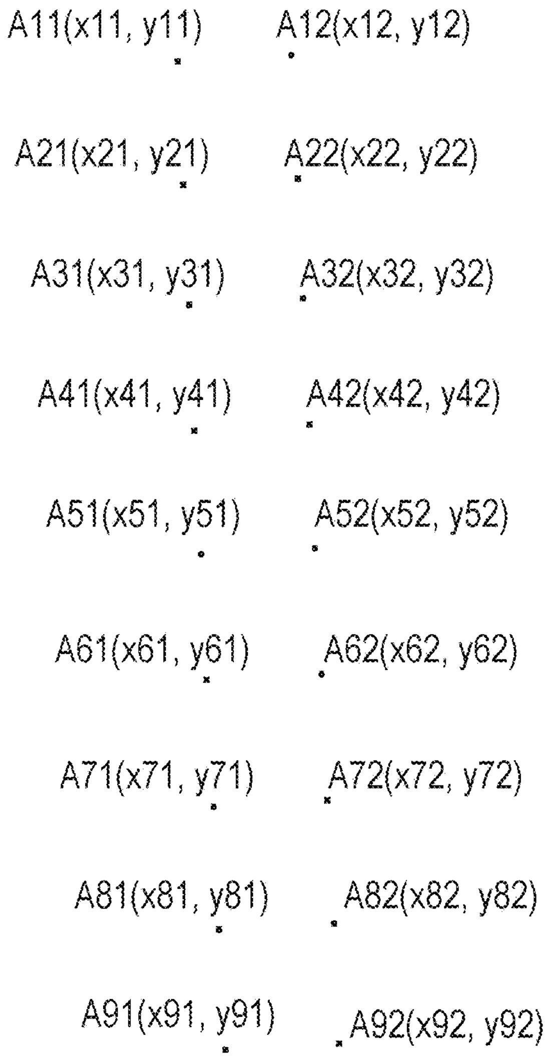

FIGS. 9A and 9B are explanatory diagrams of a method for reading dot patterns 401 according to the first embodiment. FIG. 9A shows the positional relationship between a chart in which circular dot patterns 401 are printed and a chip 901 in the CIS 106 that performs reading. FIG. 9B shows the positional relationship of the center coordinates 601 of multiple dot patterns 401 obtained on the basis of the data obtained by reading the pattern shown in FIG. 9A. FIGS. 9A and 9B show a total of 18 coordinates, coordinates A11, A21, . . . , A91, A12, A22, . . . , and A92, as the coordinates read by one chip 901 among multiple center coordinates 601. A11 and A12 are adjacent in the main scanning direction p, and A11 and A21 are adjacent in the sub-scanning direction q. As an example, a state is shown in which the center coordinates 601 of the dot pattern 401 are read offset in both the main scanning direction p and the sub-scanning direction q due to an inclination of the CIS 106 and an inclination of the chart of the set document. For such data, when A11 (x11, y11) is selected as the reference coordinates (reference point), A12 (x12, y12) is selected as the main-scanning distance measurement point, and A21 (x21, y21) is selected as the sub-scanning distance measurement point.

Figure 10:
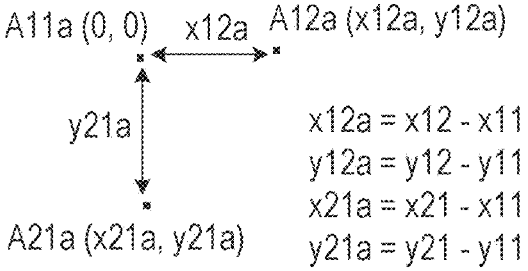
FIG. 10 is a diagram illustrating coordinate conversion according to the first embodiment.

At S803, the CPU 204 converts each distance measurement point into relative coordinates of the distance measurement points centered on the coordinates A11, which are the reference coordinates. When the coordinates of A11 after conversion are A11a (0, 0), A12 is converted into A12a (x12a, y12a), and A21 is converted into A21a (x21a, y21a). In this case, x12a=x12−x11, y12a=y12−y11, x21a=x21−x11, and y21a=y21−y11. In this case, y21a is synonymous with the sub-scanning direction distance between A11a and A21a (conveyance direction distance), and x12a is synonymous with the main scanning direction distance between A11a and A12a (width direction distance). A specific description is given below using these coordinates. FIG. 10 is an illustration of coordinate data after conversion.

At S804, the CPU 204 corrects the coordinates converted at S803 (in this example, the converted coordinates A12a and A21a) on the basis of the correction value associated with the inclination information of the CIS 106 obtained in the inclination angle obtainment processing at S502. When the inclination angle of the relevant chip is determined to be φ by the immediately preceding inclination detection of the CIS 106, A12a and A21a are converted into A12b (x12b, y12b) and A21b (x21b, y21b), respectively, with the coordinate A11a as the reference point. This correction processing may be omitted when the inclination of the CIS 106 or the chip 901 is mechanically limited and the tolerance does not affect the reading result. S804 allows for the obtainment of the main scanning direction distance x21b, which is the distance between the reference point and the converted main-scanning distance measurement point A12b, and the sub-scanning direction distance y12b, which is the distance between the reference point and the converted sub-scanning distance measurement point A21b.

At S805, the CPU 204 stores the main scanning direction distance x21b and the sub-scanning direction distance y12b calculated at S804 in the memory 208 as distance data for the coordinates A11, which is the reference coordinates. The above is the flow of the processing of obtaining the conveyance data information for one reference point, and similar processing is performed for the other arranged center coordinates 601. In the scanner 100, the CPU 204 functions as a second obtainment means that obtains, on the basis of the coordinates of the dot patterns 401, the distance in the main scanning direction p and the distance in the sub-scanning direction q between the coordinates of the dot patterns 401. Furthermore, the second obtainment means also obtains correction data by correcting these distances on the basis of the correction value associated with the inclination information of the CIS 106.

At S806, the CPU 204 determines, on the basis of the stored center coordinate data, if there are center coordinates 601 remaining that can be selected as a reference point. If the determination result at this step is true, that is, if there are no remaining center coordinates 601 that can be selected as a reference point, the process proceeds to S807. If the determination result of this step is false, that is, if center coordinates 601 that can be selected remain, the center coordinates 601 of the circular dot pattern 401 are selected by shifting the reference point by one in the sub-scanning direction q from the center coordinates 601 last selected as the reference point. In this manner, the CPU 204 obtains multiple distances in the main scanning direction p and multiple distances in the sub-scanning direction q between the coordinates of the dot patterns 401 while shifting the reference point in the sub-scanning direction q.

In this manner, the center coordinates of A11 to A(N−1)1 are selected as reference points, and the distance to each distance measurement point is obtained with the selected reference point as the center and recorded in the memory 208. Selecting A(N−1)1 as the reference point causes AN1 to become the sub-scanning distance measurement point for A(N−1)1. Since there is no data beyond that, the process ends. When distance data for all sections is collected, at S807, the CPU 204 reads the data from the memory 208 and calculates the sub-scanning direction magnification Ms. The sub-scanning direction magnification Ms is a value obtained by dividing the sum of the main scanning direction distances by the sum of the sub-scanning direction distances, and can be calculated by the following expression (1).

[Math. 1]

$$Ms = (y21b + y31b + \ldots + yN1b)/(x12b + x22b + \ldots + x(N-1)2b) \quad \text{Expression 1}$$

The sub-scanning direction magnification Ms obtained by the above calculation can be reflected in the generation timing of a line reading start trigger, enlargement/reduction correction in image processing, and the like.

Limitation of Influence of Eccentricity of Document Conveyance Roller

Figure 11:
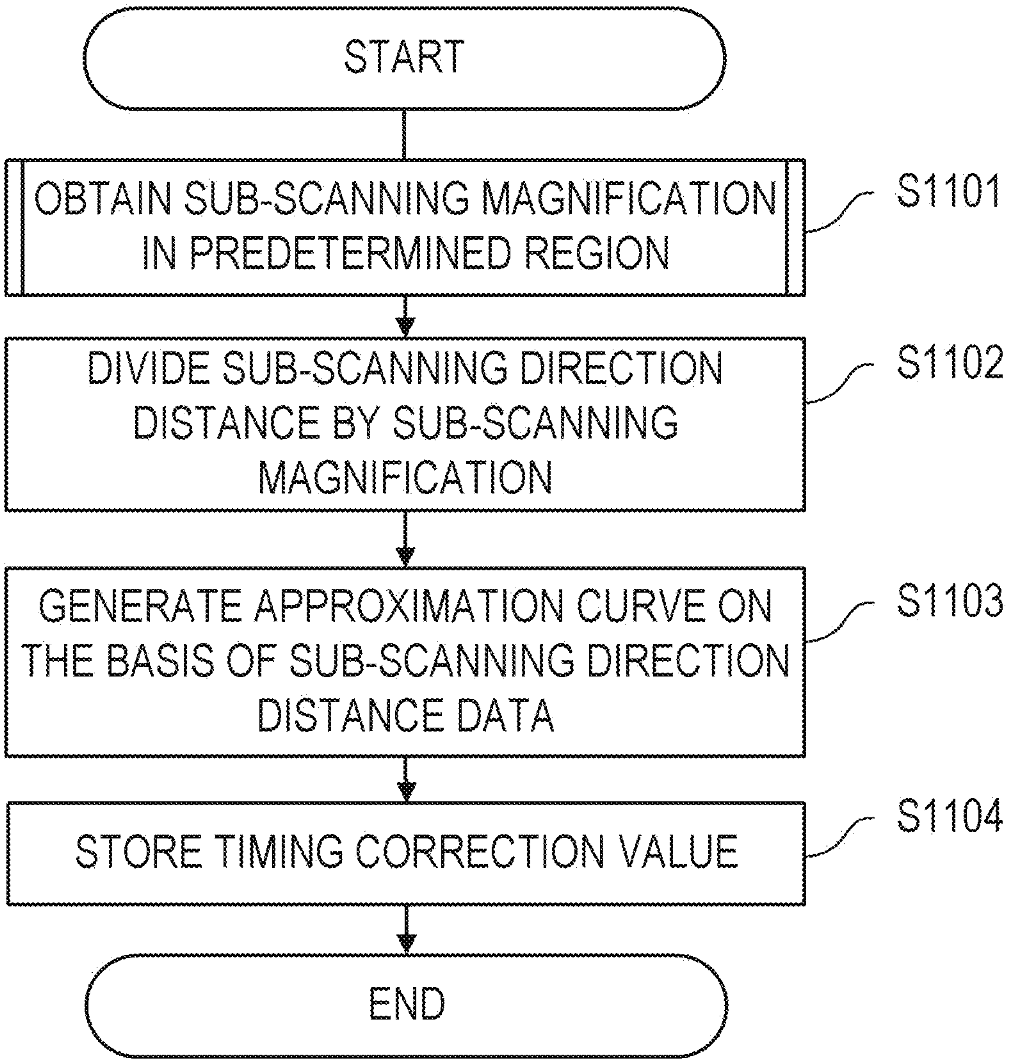
FIG. 11 is a flowchart of processing of limiting the influence of eccentricity according to the first embodiment.

Referring to FIGS. 11, 12, and 13A to 13C, the details of the processing of limiting the influence of eccentricity of the document conveyance rollers 107, 108 in the first embodiment, that is, the limitation processing at S504 in FIG. 5 are now described. FIG. 11 is a flowchart of the processing of limiting the influence of eccentricity of the document conveyance rollers 107, 108 according to the first embodiment.

The error due to eccentricity can be obtained by using the sub-scanning direction distances (y21b, y31b, . . . , yN1b) in the converted coordinate data used when obtaining the sub-scanning direction magnification Ms described above. In the processing of limiting the effects of eccentricity, first at S1101, to obtain an error due to eccentricity with high accuracy, the flow of obtaining the sub-scanning direction magnification shown in FIG. 8 is performed by expanding the region to multiple main scanning sections. Here, in the processing at S801, rather than one sensor chip, the sensor chips required for reading all dot pattern groups (Gr1 to GrM) with different sub-scanning coordinates are targeted. Also, the processing at S802 selects, as processing target coordinates, a set of two columns of dot patterns 401 having the same sub-scanning coordinates (dot patterns within the same dot pattern group) from the coordinate data of the dot patterns 401 obtained through analysis by the CPU 204. Then, the processing from S803 to S806 is performed to obtain converted coordinate data of the data of all target sensor chips. The processing at S1101 obtains the converted coordinate data of the dot patterns 401 in the obtainment target region and the sub-scanning direction magnification Ms.

Figure 12:
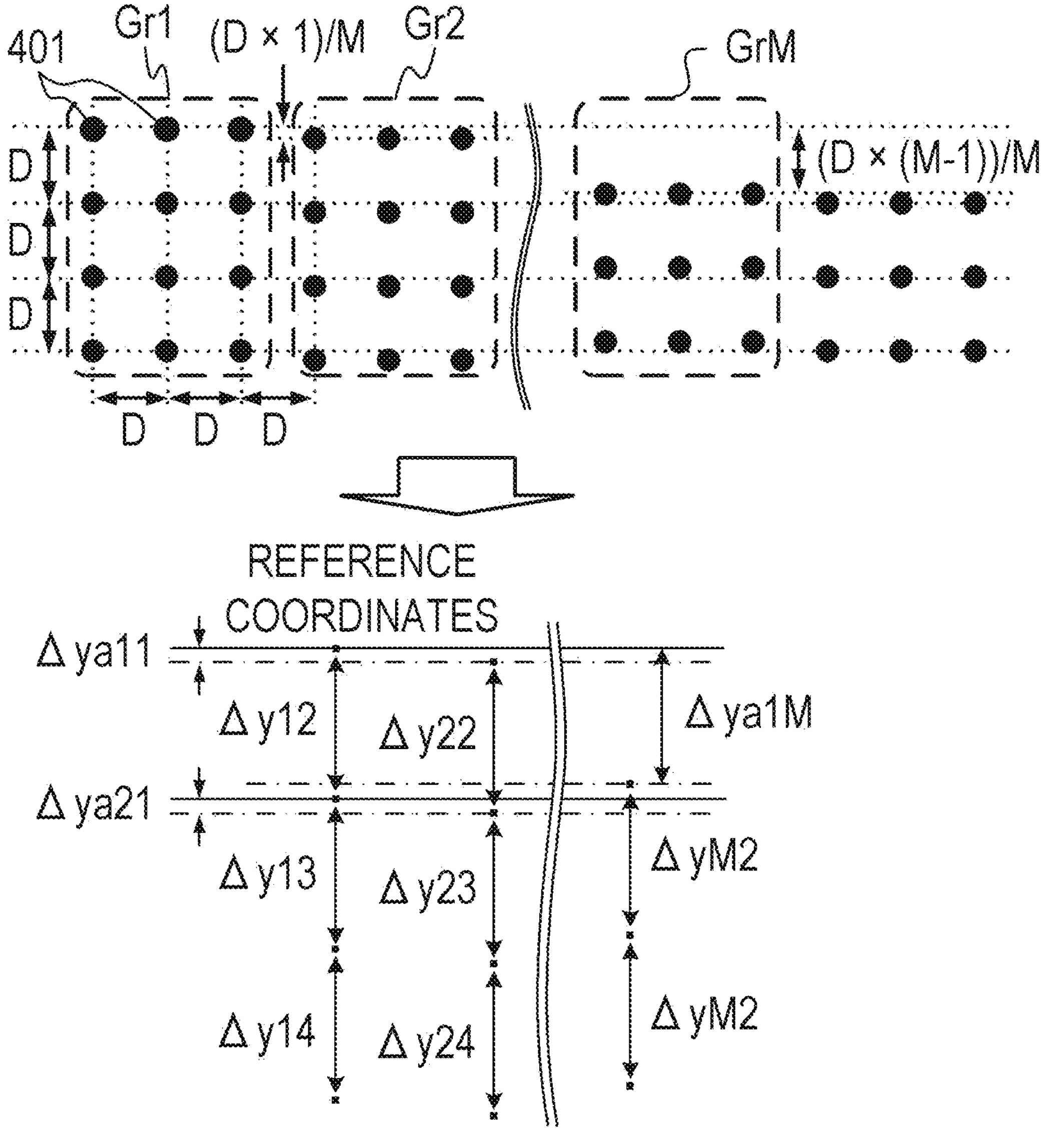
FIG. 12 is an explanatory diagram of a sub-scanning direction distance according to the first embodiment.

At S1102, the sub-scanning direction distance is obtained from the converted coordinate data obtained at S1101, and the obtained value is divided by the sub-scanning direction magnification Ms. The sub-scanning direction distance refers to the distance (yN1b) between the converted coordinate data adjacent in the sub-scanning direction q, indicated by y21a in FIG. 10. The CPU 204 obtains the distance between each piece of the converted coordinate data, and divides the value by the sub-scanning direction magnification Ms. When the sub-scanning direction distances divided by the sub-scanning direction magnification Ms are Δy2, Δy3, . . . , ΔyN, ΔyN=yN1b/Ms is established. FIG. 12 is an explanatory diagram of the sub-scanning direction distances Δy (Δy2 to ΔyN). FIG. 12 shows the relationship between the pattern arrangement of the dot patterns 401 of the calibration chart 400 and the sub-scanning direction distances after division obtained by reading and performing arithmetic processing on the pattern arrangement. Here, the sub-scanning direction distances after division in the dot pattern group GrX are represented as ΔyX2 to ΔyXN. Also, the relative sub-scanning direction distance with the coordinates of the dot pattern group Gr1 used as the reference is represented as Δya.

The divided sub-scanning direction distance Δy is recorded in the memory 208 in a pair with the relative coordinates with the reference coordinate as 0. The same processing is performed for all the coordinate data.

Figure 13A:
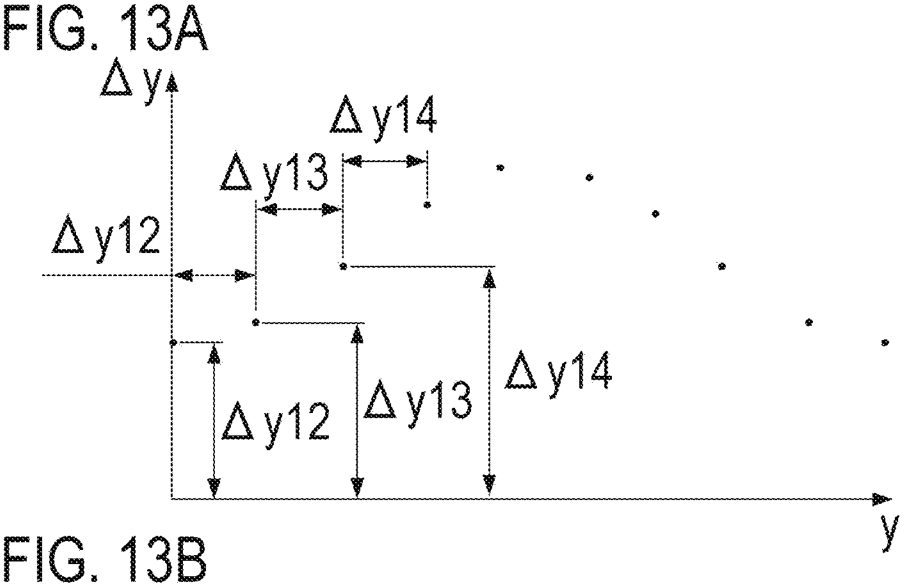
FIGS. 13A to 13C are explanatory diagrams of a method for generating an approximation curve according to the first embodiment.
Figure 13B:
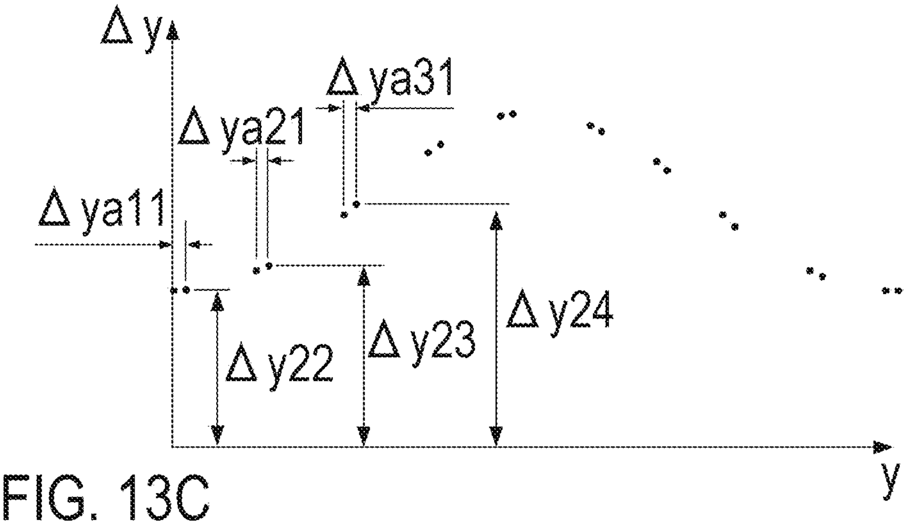
Figure 13C:
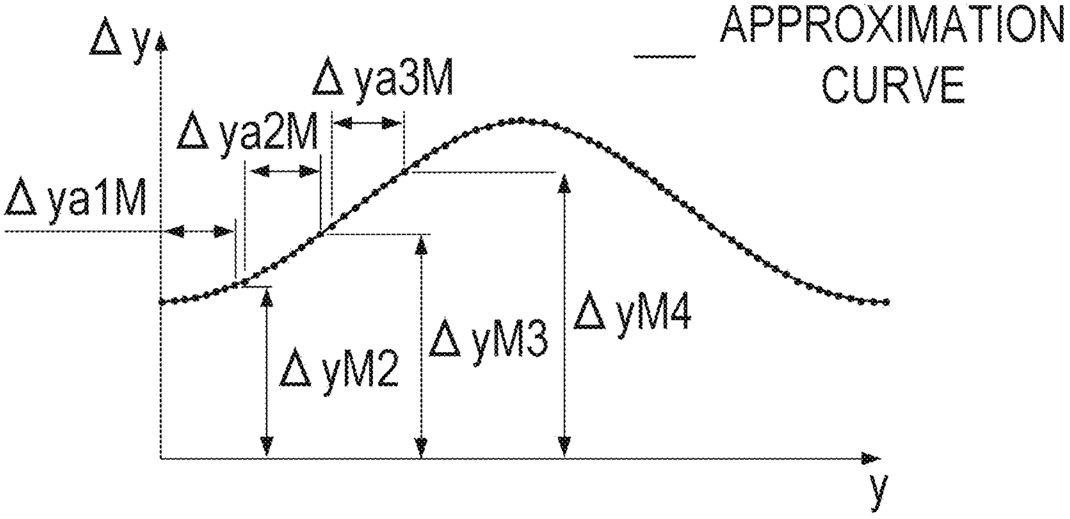

The sub-scanning direction distance Δy obtained at S1102 may be regarded as the conveyance amount per short-term section of the document conveyance rollers 107, 108. As such, at S1103, the CPU 204 obtains an approximation curve with the vertical axis representing the sub-scanning direction distance Δy (the conveyance amount per unit section) and the horizontal axis representing the cumulative added value y (the conveyance amount added value) of the sub-scanning direction distance Δy. FIGS. 13A to 13C are explanatory diagrams of a method for generating an approximation curve according to the first embodiment. First, the CPU 204 creates a sequence in which the horizontal axis represents the cumulative added value y and the vertical axis represents Δy, using the sub-scanning direction distances Δy obtained from the coordinate data corresponding to the dot pattern group Gr1. FIG. 13A shows an example in which the created sequence is plotted on a graph. Then, the values of the sub-scanning direction distances Δy obtained from the coordinate data corresponding to the dot pattern group Gr2 are inserted into this sequence, so that the values of Δy are plotted at positions where the y coordinate is shifted by Δya relative to the plots of dot pattern group Gr1, as shown in FIG. 13B. Similarly, the values of the sub-scanning direction distances Δy of the other dot pattern groups Gr3 to GrM are inserted, so that a sequence is created that is plotted at short intervals on a graph as shown in FIG. 13C. On the basis of this sequence, the equation for the approximation curve is obtained using the method of least squares.

For example, with a configuration in which the dot patterns 401 of the calibration chart 400 are arranged side by side in the sub-scanning direction q without being offset in the main scanning direction p, the data obtained for creating the approximation curve is limited to that shown in FIG. 13A. However, in the first embodiment, the dot patterns 401 of the calibration chart 400 are offset in the sub-scanning direction q, so that the approximation curve can be created with high accuracy on the basis of a larger amount of data, as shown in FIG. 13C.

At S1104, the CPU 204 stores a timing correction value. The use of the equation of the approximation curve obtained at S1103 allows a correction value to be obtained for reading an image by the CIS 106 at any rotation angle of the document conveyance rollers 107, 108. In this example, the correction value for reading an image by the CIS 106 is a value for correcting the generation timing of a reading start trigger. The memory 208 of the scanner 100 stores a table for holding timing correction values for the conveyance amount per unit section, and the timing correction value obtained at S1104 is held in this table. In the scanner 100, the CPU 204 functions as a third obtainment means that obtains a correction value for correcting the generation timing of a reading start trigger for the CIS 106 on the basis of the distance between dot patterns and the amount of conveyance per unit section of the document conveyance rollers 107, 108.

The timing correction data held in the timing correction table is read out during normal reading operations and is used to perform fine adjustment of the generation timing of a line reading start trigger. As a result of this fine adjustment, for sections where the conveyance amount in the unit section is greater than the theoretical value, the generation timing of a line reading start trigger is earlier than the initial value, and for sections where the conveyance amount in the unit section is less than the theoretical value, the generation timing is later than the initial value. As a result, even when there are variations in the conveyance amount due to eccentricity of the document conveyance rollers 107, 108, the line reading cycle is constant, thereby improving the reading quality.

Advantageous Effects of Configuration of First Embodiment

According to the configuration of the first embodiment, the use of the read data of dot patterns 401 arranged at different main scanning coordinates so as to interpolate between dot patterns in the sub-scanning direction q allows the influence of eccentricity to be obtained with high resolution even when the distance between dot patterns cannot be short. This enables the obtainment of a highly accurate approximation curve equation and the determination of the generation timing of a reading start trigger with high accuracy, thereby allowing the scanner 100 to read images with high accuracy.

When the size of the dot patterns is small, any dirt or dust on the calibration chart tends to result in erroneous detection of the center coordinates of patterns during calibration reading. The use of the present technology allows the dot patterns to have a size that is large enough to be unaffected by dirt or dust. When only the coordinates of dot patterns arranged on the same main scanning coordinate are used, the intervals between plots are large, causing the accuracy to be insufficient near the maximum amplitude of the curve. In contrast, the above scanner 100 can obtain an approximation curve equation with higher accuracy by using a large amount of coordinate data. At the same time, since it is possible to obtain an approximation curve equation from a large amount of coordinate data, the above-described scanner 100 can also reduce the influence of minute variations of the coordinates caused by reading errors.

In applying the present invention, the processing described in the above embodiments as being performed by one apparatus may be shared and executed by multiple apparatuses. Alternatively, the processing described as being performed by different apparatuses may be performed by a single apparatus. For example, the scanner 100 may include multiple CPUs separately serving as a first obtainment means for obtaining the coordinates of the dot patterns 401, a second obtainment means for obtaining the distances between the coordinates of the dot patterns 401, and a third obtainment means for obtaining correction values. In this manner, in a computer system, the hardware configuration that provides each function may be flexibly changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-212165, filed on Dec. 15, 2023, which is hereby incorporated by reference herein in its entirety.

What is claimed is:

1. The image reading apparatus comprising:
- a conveyance roller configured to convey a document in a conveyance direction;
- a plurality of line image sensors configured to read an image on the document conveyed by the conveyance roller;
- a first obtainment means configured to obtain coordinates of a plurality of dot patterns on the basis of read data obtained by reading a chart including a first dot column and a second dot column including the plurality of dot patterns arranged in the conveyance direction, the first dot column and the second dot columns being printed at different locations in a width direction intersecting the conveyance direction;
- a second obtainment means configured to obtain a distance between coordinates of dot patterns that are adjacent to each other on the basis of the coordinates obtained by the first obtainment means; and
- a third obtainment means configured to obtain a correction value for reading of the image by the line image sensors on the basis of the distance obtained by the second obtainment means,
- wherein the dot patterns of the first dot column and the dot patterns of the second dot column are arranged to be offset from each other in the conveyance direction in the chart, and
- wherein the third obtainment means is configured to obtain the correction value on the basis of a conveyance direction distance between coordinates of dot patterns adjacent to each other in the conveyance direction in the first dot column and a conveyance direction distance between coordinates of dot patterns adjacent to each other in the conveyance direction in the second dot column that are obtained by the second obtainment means.

2. The image reading apparatus according to claim 1, wherein the correction value is a value for correcting a generation timing of a reading start trigger.

3. The image reading apparatus according to claim 1, wherein the chart includes a plurality of the first dot columns including the dot patterns at mutually same positions in the conveyance direction, the plurality of the first dot columns being arranged in the width direction, and a plurality of the second dot columns including the dot patterns at mutually same positions in the conveyance direction, the plurality of the second dot columns being arranged in the width direction.

4. The image reading apparatus according to claim 3,
- wherein the second obtainment means is configured to obtain a width direction distance between coordinates of dot patterns adjacent to each other in the width direction in the plurality of first dot columns, and a width direction distance between coordinates of dot patterns adjacent to each other in the width direction in the plurality of second dot columns, and wherein the third obtainment means is configured to obtain the correction value on the basis of a plurality of the conveyance direction distances and a plurality of the width direction distances obtained by the second obtainment means.

5. The image reading apparatus according to claim 4, wherein the third obtainment means is configured to obtain the correction value according to an equation of an approximation curve obtained by plotting a value obtained by dividing the width direction distance by a sub-scanning direction magnification that is a value obtained by dividing a sum of the plurality of conveyance direction distances by a sum of the plurality of width direction distances.

6. The image reading apparatus according to claim 3, wherein the plurality of dot patterns is arranged at regular intervals of a distance D in the width direction in the chart, and wherein the chart has M dot pattern groups each including a plurality of dot columns including the dot patterns at mutually same positions in the conveyance direction, and an amount of offset in the conveyance direction between the dot patterns in the first dot column and the dot patterns in the second dot column is a multiple of D/M.

7. The image reading apparatus according to claim 6, wherein in a case R is a radius of each of the dot pattern, the M satisfies $M \geq D/(2 \times R)$.

8. The image reading apparatus according to claim 6, wherein each of the line image sensor includes a plurality of chips including a light receiving element, and wherein at least one of the dot pattern groups is arranged in the chart corresponding to a position in the width direction of each of the plurality of chips.

9. The image reading apparatus according to claim 1, wherein the dot patterns are arranged over a circumferential length of the conveyance roller in the conveyance direction of the chart.

10. The image reading apparatus according to claim 1, wherein each of the dot pattern has a circular shape, and wherein the first obtainment means is configured to obtain center coordinates of the circular shape of each of the dot pattern as the coordinates of each of the dot pattern.

11. The image reading apparatus according to claim 1, wherein the second obtainment means is configured to obtain, on the basis of the coordinates obtained by the first obtainment means, a plurality of conveyance direction distances between coordinates of dot patterns adjacent in the conveyance direction while shifting reference coordinates in the conveyance direction.

12. The image reading apparatus according to claim 1, wherein the plurality of line image sensors is arranged in a staggered pattern in the width direction.

* * * * *